United States Patent
Januszewski et al.

(10) Patent No.: US 12,219,384 B1
(45) Date of Patent: Feb. 4, 2025

(54) CONTROL PLANE OVERLOAD MITIGATION CAPABILITY

(71) Applicant: Nokia Solutions and Networks Oy, Espoo (FI)

(72) Inventors: Maciej Januszewski, Wroclaw (PL); Wojciech Anzel, Cracow (PL); Patryk Kowalewski, Wroclaw (PL); Sebastian Kuczynski, Wroclaw (PL); Krzysztof Kurnicki, Wroclaw (PL); Przemyslaw Jackowiak, Cracow (PL)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 18/769,776

(22) Filed: Jul. 11, 2024

(30) Foreign Application Priority Data

Oct. 10, 2023 (FI) ...................................... 20236122

(51) Int. Cl.
*H04W 28/02* (2009.01)
(52) U.S. Cl.
CPC ............................... *H04W 28/0289* (2013.01)
(58) Field of Classification Search
CPC .................................................. H04W 28/0289
See application file for complete search history.

(56) References Cited

U.S. PATENT DOCUMENTS

| | | | |
|---|---|---|---|
| 2022/0078631 A1 | 3/2022 | Salahuddeen et al. | |
| 2022/0286754 A1* | 9/2022 | Pandit | H04N 21/4621 |
| 2023/0006717 A1* | 1/2023 | Sahin | H04B 7/0639 |
| 2023/0112049 A1 | 4/2023 | Hu et al. | |
| 2023/0199553 A1 | 6/2023 | Uziel et al. | |
| 2023/0319616 A1* | 10/2023 | Lunardi | H04W 28/0289 370/329 |
| 2024/0224133 A1* | 7/2024 | Wang | H04W 36/305 |

FOREIGN PATENT DOCUMENTS

| | | | | |
|---|---|---|---|---|
| EP | 3920468 A1 | 12/2021 | | |
| WO | WO-2019138359 A1 * | 7/2019 | ............ | H04L 69/40 |
| WO | WO-2022266423 A1 * | 12/2022 | ............ | H04B 17/309 |
| WO | 2023/070055 A1 | 4/2023 | | |
| WO | WO-2023076337 A1 * | 5/2023 | ............ | H04B 7/0452 |
| WO | 2023/148088 A1 | 8/2023 | | |
| WO | WO-2024016277 A1 * | 1/2024 | ............ | H04L 47/263 |

(Continued)

OTHER PUBLICATIONS

Liao et al., "Development of C-Plane DoS Attacker for O-RAN FHI", Proceedings of the 28th Annual International Conference on Mobile Computing And Networking, Oct. 17-21, 2022, pp. 850-852.

(Continued)

*Primary Examiner* — Mehmood B. Khan
(74) *Attorney, Agent, or Firm* — Nokia Technologies Oy (57) ABSTRACT

Disclosed is a method comprising transmitting, by an apparatus, to a distributed unit, information indicating one or more capabilities of the apparatus, wherein the one or more capabilities comprise at least a capability for mitigating an overload of a control plane processing capacity of the apparatus in a slot; and receiving, by the apparatus, from the distributed unit, based on transmitting the information, one or more messages comprising a plurality of control plane sections to be processed in one or more slots.

9 Claims, 4 Drawing Sheets

(56) References Cited

FOREIGN PATENT DOCUMENTS

| WO | WO-2024030903 A1 | * | 2/2024 | ............ | H04B 17/309 |
| WO | WO-2024112331 A1 | * | 5/2024 | ............ | H04W 48/06 |

OTHER PUBLICATIONS

"IEEE 802.11", Wikipedia, Retrieved on Jun. 10, 2024, Webpage available at : https://en.wikipedia.org/wiki/IEEE_802.11.

"IEEE 802.15", Wikipedia, Retrieved on Jun. 10, 2024, Webpage available at : https://en.wikipedia.org/wiki/IEEE_802.15.

Office action received for corresponding Finnish Patent Application No. 20236122, dated Mar. 4, 2024, 13 pages.

"Publicly Available Specification (PAS); O-RAN Fronthaul Control, User and Synchronization Plane Specification v07.02; (O-RAN-WG4.CUS.0-v07.02)", ETSI TS 103 859, V7.0.2, Sep. 2022, pp. 1-318.

"O-RAN Working Group 4 (Open Fronthaul Interfaces WG) Management Plane Specification", O-RAN Alliance, O-RAN.WG4.MP.0-R003, V14.00, Feb. 2024, pp. 1-329.

Office action received for corresponding Finnish Patent Application No. 20236122, dated May 2, 2024, 5 pages.

Extended European Search Report received for corresponding European Patent Application No. 24182242.8, dated Oct. 29, 2024, 11 pages.

* cited by examiner

CONTROL PLANE OVERLOAD MITIGATION CAPABILITY

RELATED APPLICATION

This application claims benefit of priority from Finnish Patent App. No. 20236122, filed Oct. 10, 2023, the disclosure of which is hereby incorporated in its entirety by reference herein.

FIELD

The following example embodiments relate to wireless communication.

BACKGROUND

In a wireless communication system, it is desirable to improve the performance of the system to enable more efficient usage of network resources and improved user experience.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions that, when executed by the at least one processor, cause the apparatus at least to: transmit, to a distributed unit, information indicating one or more capabilities of the apparatus, wherein the one or more capabilities comprise at least a capability for mitigating an overload of a control plane processing capacity of the apparatus in a slot; and receive, from the distributed unit, based on transmitting the information, one or more messages comprising a plurality of control plane sections to be processed in one or more slots.

According to another aspect, there is provided an apparatus comprising: means for transmitting, to a distributed unit, information indicating one or more capabilities of the apparatus, wherein the one or more capabilities comprise at least a capability for mitigating an overload of a control plane processing capacity of the apparatus in a slot; and means for receiving, from the distributed unit, based on transmitting the information, one or more messages comprising a plurality of control plane sections to be processed in one or more slots.

According to another aspect, there is provided a method comprising: transmitting, by an apparatus, to a distributed unit, information indicating one or more capabilities of the apparatus, wherein the one or more capabilities comprise at least a capability for mitigating an overload of a control plane processing capacity of the apparatus in a slot; and receiving, by the apparatus, from the distributed unit, based on transmitting the information, one or more messages comprising a plurality of control plane sections to be processed in one or more slots.

According to another aspect, there is provided a computer program comprising instructions which, when executed by an apparatus, cause the apparatus to perform at least the following: transmitting, to a distributed unit, information indicating one or more capabilities of the apparatus, wherein the one or more capabilities comprise at least a capability for mitigating an overload of a control plane processing capacity of the apparatus in a slot; and receiving, from the distributed unit, based on transmitting the information, one or more messages comprising a plurality of control plane sections to be processed in one or more slots.

According to another aspect, there is provided a computer readable medium comprising program instructions which, when executed by an apparatus, cause the apparatus to perform at least the following: transmitting, to a distributed unit, information indicating one or more capabilities of the apparatus, wherein the one or more capabilities comprise at least a capability for mitigating an overload of a control plane processing capacity of the apparatus in a slot; and receiving, from the distributed unit, based on transmitting the information, one or more messages comprising a plurality of control plane sections to be processed in one or more slots.

According to another aspect, there is provided a non-transitory computer readable medium comprising program instructions which, when executed by an apparatus, cause the apparatus to perform at least the following: transmitting, to a distributed unit, information indicating one or more capabilities of the apparatus, wherein the one or more capabilities comprise at least a capability for mitigating an overload of a control plane processing capacity of the apparatus in a slot; and receiving, from the distributed unit, based on transmitting the information, one or more messages comprising a plurality of control plane sections to be processed in one or more slots.

According to another aspect, there is provided an apparatus comprising at least one processor, and at least one memory storing instructions that, when executed by the at least one processor, cause the apparatus at least to: receive, from a radio unit, information indicating one or more capabilities of the radio unit, wherein the one or more capabilities comprise at least a capability for mitigating an overload of a control plane processing capacity of the radio unit in a slot; generate, based at least on the information, one or more messages comprising a plurality of control plane sections to be processed in one or more slots; and transmit the one or more messages to the radio unit.

According to another aspect, there is provided an apparatus comprising: means for receiving, from a radio unit, information indicating one or more capabilities of the radio unit, wherein the one or more capabilities comprise at least a capability for mitigating an overload of a control plane processing capacity of the radio unit in a slot; means for generating, based at least on the information, one or more messages comprising a plurality of control plane sections to be processed in one or more slots; and means for transmitting the one or more messages to the radio unit.

According to another aspect, there is provided a method comprising: receiving, from a radio unit, information indicating one or more capabilities of the radio unit, wherein the one or more capabilities comprise at least a capability for mitigating an overload of a control plane processing capacity of the radio unit in a slot; generating, based at least on the information, one or more messages comprising a plurality of control plane sections to be processed in one or more slots; and transmitting the one or more messages to the radio unit.

According to another aspect, there is provided a computer program comprising instructions which, when executed by an apparatus, cause the apparatus to perform at least the following: receiving, from a radio unit, information indicating one or more capabilities of the radio unit, wherein the one or more capabilities comprise at least a capability for mitigating an overload of a control plane processing capacity of the radio unit in a slot; generating, based at least on the information, one or more messages comprising a plurality of control plane sections to be processed in one or more slots; and transmitting the one or more messages to the radio unit.

According to another aspect, there is provided a computer readable medium comprising program instructions which, when executed by an apparatus, cause the apparatus to perform at least the following: receiving, from a radio unit, information indicating one or more capabilities of the radio unit, wherein the one or more capabilities comprise at least a capability for mitigating an overload of a control plane processing capacity of the radio unit in a slot; generating, based at least on the information, one or more messages comprising a plurality of control plane sections to be processed in one or more slots; and transmitting the one or more messages to the radio unit.

According to another aspect, there is provided a non-transitory computer readable medium comprising program instructions which, when executed by an apparatus, cause the apparatus to perform at least the following: receiving, from a radio unit, information indicating one or more capabilities of the radio unit, wherein the one or more capabilities comprise at least a capability for mitigating an overload of a control plane processing capacity of the radio unit in a slot; generating, based at least on the information, one or more messages comprising a plurality of control plane sections to be processed in one or more slots; and transmitting the one or more messages to the radio unit.

According to another aspect, there is provided a system comprising at least a radio unit and a distributed unit. The radio unit is configured to: transmit, to the distributed unit, information indicating one or more capabilities of the radio unit, wherein the one or more capabilities comprise at least a capability for mitigating an overload of a control plane processing capacity of the radio unit in a slot; and receive, from the distributed unit, based on transmitting the information, one or more messages comprising a plurality of control plane sections to be processed in one or more slots. The distributed unit is configured to: receive, from the radio unit, the information indicating the one or more capabilities of the radio unit; generate, based at least on the information, the one or more messages comprising the plurality of control plane sections to be processed in the one or more slots; and transmit the one or more messages to the radio unit.

LIST OF DRAWINGS

In the following, various example embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

The open radio access network (O-RAN) refers to a concept based on interoperability of radio access network (RAN) elements between different vendors over a set of defined interfaces. Thus, O-RAN enables, for example, distributed unit and radio unit components from different vendors to operate together. However, it should be noted that the O-RAN interface can also be used in a single-vendor deployment, if a given vendor uses the O-RAN fronthaul interface standard for communication between the distributed unit and the radio unit.

Figure 1:
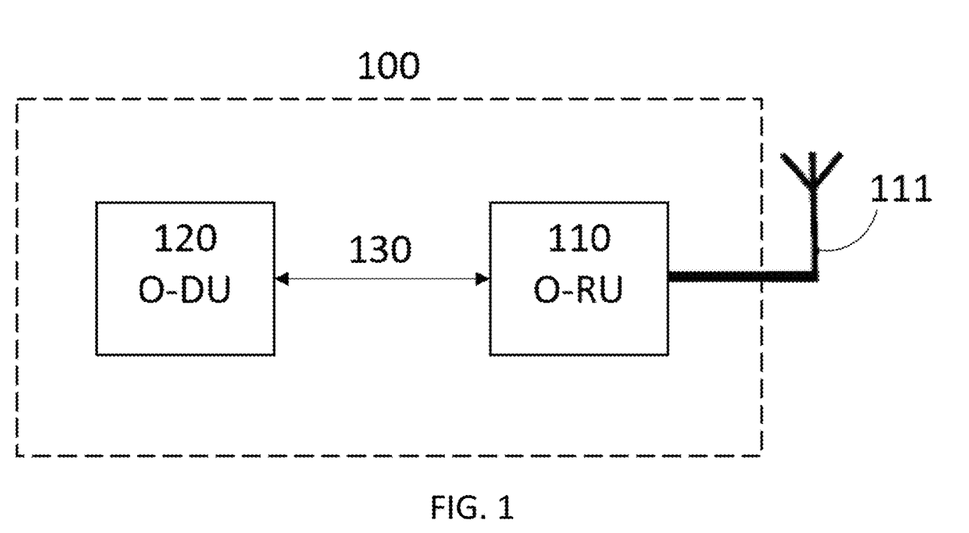
FIG. 1 illustrates an example of a base station.

FIG. 1 illustrates an example of a system, to which some example embodiments may be applied. FIG. 1 shows a simplified O-RAN base station architecture, wherein a base station 100 may comprise two main nodes: the O-RAN distributed unit 120 (O-DU) and the O-RAN radio unit 110 (O-RU). The O-DU 120 and the O-RU 110 are connected by a fronthaul interface 130, which may be implemented over an optical fiber or Ethernet connection, for example. The fronthaul interface 130 may be based on, for example, the evolved common public radio interface (eCPRI) protocol. eCPRI may also be referred to as enhanced common public radio interface.

The O-DU 120 is a processing unit that handles the high-level, real-time functions of the RAN. For example, the O-DU 120 may host the radio link control (RLC), medium access control (MAC), and high-physical layers. The O-DU 120 may handle digital signal processing and baseband processing, and it may also control the operation of the O-RU 110.

The O-RU 110 is responsible for transmission and reception of radio frequency (RF) signals. The O-RU 110 is a logical node which may host, for example, the low-physical layer and radio frequency processing. The O-RU 110 may connect one or more user equipments (UEs) to the O-RAN. In the downlink direction, the O-RU 110 may process data received from the O-DU 120 via the fronthaul interface 130, and outputs in-phase and quadrature (IQ) data as a radio frequency signal via an antenna 111. In the uplink direction, the O-RU 110 receives a radio frequency signal via the antenna 111, processes the radio frequency signal, and outputs data to the O-DU 120 via the fronthaul interface 130. It should be noted that the O-RAN base station 100 may comprise one or more O-RUs 110.

Some example embodiments address limitations in the control plane on the fronthaul interface 130, when using the O-RAN eCPRI standard between the O-DU 120 and the O-RU 110. Some example embodiments may extend the set of O-RU capabilities reported over the O-RAN management plane (M-Plane) to allow the O-DU to utilize the radio resource management (RRM) potential to a greater extent.

The O-RAN Alliance's open fronthaul interface specification defines a set of O-RU capabilities that determine the O-RU's capacity for handling the control plane (i.e., commands sent by the O-DU to the O-RU that instruct the O-RU on how to perform reception and transmission during a specified timespan). For example, the O-RU may report, to the O-DU, the O-RU capabilities related to the capacity for the maximum number of control plane (C-Plane) sections and beams that are supported per orthogonal frequency-division multiplexing (OFDM) symbol and per slot. These directly limit the granularity of layer 2 (L2) scheduling allocations, since the O-DU is not allowed to exceed those limitations.

Thus, the set of O-RU capabilities may restrict the configuration that the O-DU is allowed to request from the O-RU. The capabilities may be defined as hard limits on the complexity of the configuration that, on one hand, shall not be exceeded by the O-DU, but also shall be unconditionally handled by the O-RU. This is not optimal for the following two reasons.

The first reason is that, in certain cases, it would be beneficial or even necessary to allow the O-DU to exceed the capacity of the O-RU. For example, in the case of ultra-reliable low-latency communications (URLLC) traffic, the resource allocation for the high-priority low-latency traffic may happen late, possibly after the configuration for the normal traffic has been sent to the O-RU. In this case, the overall configuration (for the normal and the high-priority low-latency traffic) may exceed the O-RU's capacity, even if it is expected that the configuration for high-priority low-latency traffic would override the configuration for the normal traffic.

The second reason is that the requirement for the O-RU to unconditionally handle any configuration, which is within the reported capacity, requires the O-RU to apply a safety margin and report a capacity that is significantly lower than the actual capacity that the O-RU could handle conditionally, or the capacity that the O-RU could handle with a high probability but without a guarantee or on a "best effort" basis (if the conditions are too complex to define and are considered to be uncontrolled factors). At present, the O-DU is not allowed to use the O-RU's capacity in the safety margin, even if occasional failure of the O-RU to handle the configuration would be acceptable, such as in the case of low-priority traffic.

In practice, this may lead to considerable underutilization of such a system. For example, assuming the full load of a cell is utilized for 5 minutes daily, then the cell may be underutilized for approximately 99.99965% of the time. By relaxing the capacity limit of the O-RU, more precise (UE-optimized) beams could be assigned to the UE's control data, or the fronthaul dimensioning (including both O-DU and O-RU) could be optimized.

Another side of the problem is insufficient clarity on how the O-RU limitations are defined. Generally, these capabilities (numbers) may be reported per extended antenna-carrier (eAxC). The limits may be dependent or independent from other eAxCs. For the case where they are dependent on each other, the O-RAN standard defines a "group of endpoints sharing capacity", but that does not solve the problem fully. The O-RU's capacity to process a certain number of C-Plane sections may depend largely on how the C-Plane sections are constructed (e.g., section extensions, usage of reMask or section priorities, etc.). The current scheme of reporting O-RU capabilities does not capture such dependencies in any way, and hence it forces to always dimension against the worst-case scenario, potentially resulting in underutilized processing capacity.

One possible solution for this is to allow the O-DU to use the capabilities reported by the O-RU more aggressively, even overshooting them temporarily, to get closer to the actual O-RU capacity limitation, and also closer to the maximum potential of RRM algorithms on a given hardware.

However, the main obstacle for such a solution is that the current standard does not define what should happen if the O-DU exceeds the number of C-Plane sections or beams reported by the O-RU, since such a scenario is assumed to not be possible with a compliant O-DU. Thus, it is unclear whether the consequence of such an overload would be limited to the slot where it occurred, or if the O-RU would remain overloaded for multiple slots because of such a momentary uncontrolled burst of C-Plane sections. Potentially, this could lead to other types of O-RU instability or even a crash.

Some example embodiments may address the above issues by allowing more flexible utilization of the O-RU processing resources. In other words, the O-RU's capacity effectively available for the O-DU may be extended by allowing the O-DU to utilize the conditional capacity (e.g., in the safety margin) of the O-RU.

In some example embodiments, the set of capabilities reported by the O-RU may be extended, so that the O-RU can inform the O-DU that the O-RU is capable of handling C-Plane overload. Such a capability may indicate that the O-RU's processing capacity for consecutive slots is independent, and the consequences of the O-DU scheduler exceeding the C-Plane processing capacity of the O-RU in a certain slot will be limited to that slot, thus having no adverse effect on subsequent slots. For example, this capability may mean that the O-RU can discard some fast control plane (FCP) sections, when the O-RU is not able to process them in time for a given slot.

In other words, the O-RU may inform the O-DU that the O-RU is able to stop processing C-Plane sections related to a given slot, if the O-RU gets overloaded in that slot, so that the consequences of overloading the C-Plane processing capacity of the O-RU are limited to that slot. This may allow the O-DU to employ more aggressive packet scheduling and beam selection techniques.

Even if this would result in the O-RU being overloaded in very rare situations, the effects of the overload would be limited to a single lost slot or even just part of the slot (i.e., some sections). This is something that may sometimes happen on the air interface anyway, and it can be dealt with via retransmission. However, the benefit of the C-Plane overload mitigation capability is higher utilization of the system throughout the remaining slots, which may improve several performance metrics. For example, it may provide better spectral efficiency from a given hardware. As another example, it may enable to schedule more UEs in a slot, which may also lead to the reduced end-to-end round-trip latency. It may also provide better performance of the physical control channels due to the ability to schedule them with a higher beam granularity.

Figure 2:
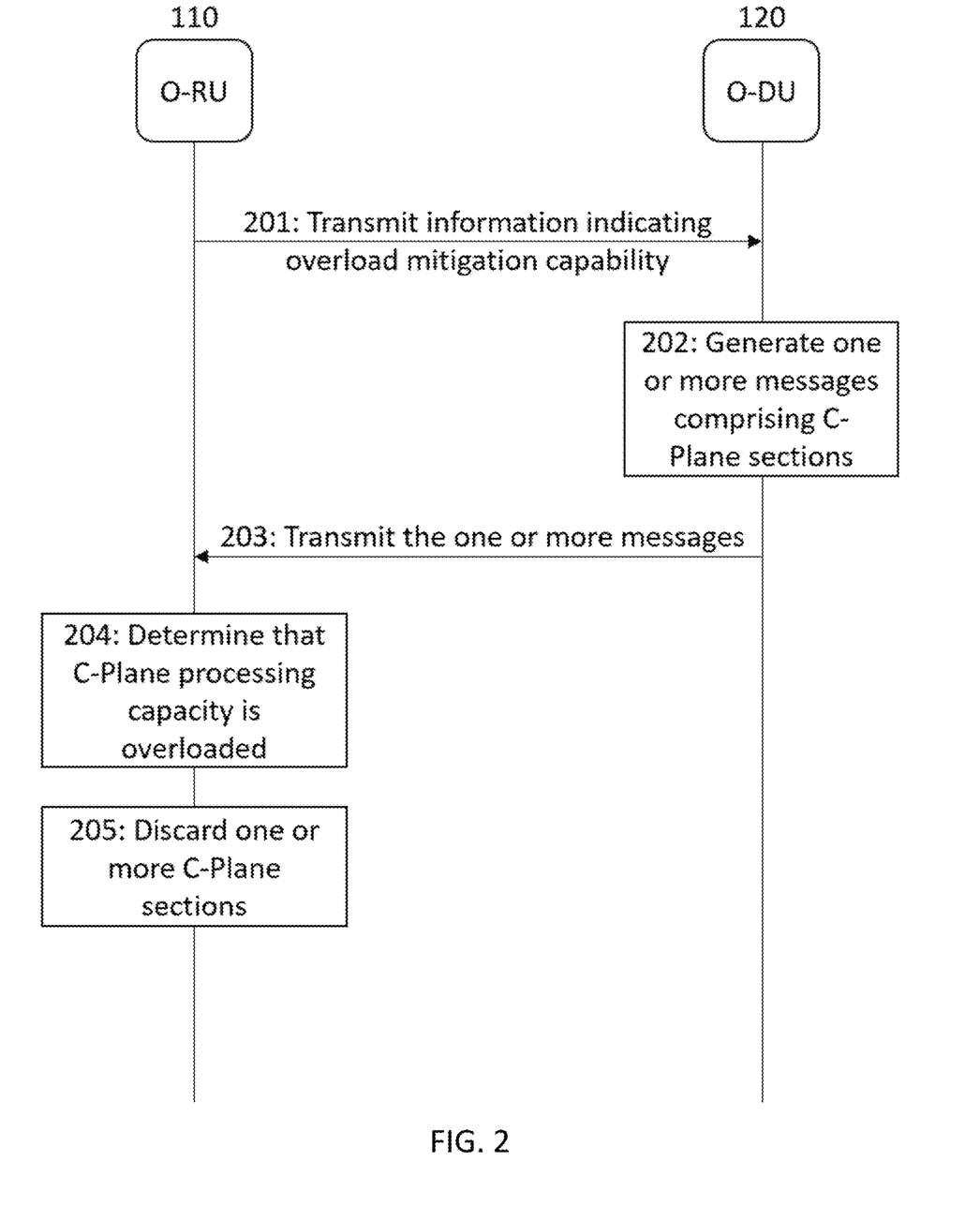
FIG. 2 illustrates a signal flow diagram.

FIG. 2 illustrates a signal flow diagram according to an example embodiment.

Referring to FIG. 2, at 201, the O-RU 110 transmits, to the O-DU 120, information indicating one or more capabilities of the O-RU 110, wherein the one or more capabilities comprise at least a capability for mitigating an overload of a control plane processing capacity of the O-RU 110 in a slot. For example, the information may be transmitted via an eCPRI fronthaul interface between the O-RU 110 and the O-DU 120. The O-DU 120 receives the information.

In the information, the O-RU 110 may also report its control plane processing capacity, which indicates the maximum number of control plane sections that the O-RU 110 can process per slot.

Herein the term "slot" is related to time, and it is a term defined by the $3^{rd}$ generation partnership project (3GPP). A given slot may comprise a plurality of OFDM symbols (e.g., downlink symbols and/or uplink symbols). For example, in 5G, a slot may comprise 14 OFDM symbols, and the time duration of a slot may depend on the so-called numerology.

At 202, the O-DU 120 generates, based at least on the information, one or more messages comprising a plurality of control plane sections to be processed by the O-RU 110 in one or more slots.

The one or more messages may be generated such that the reported control plane processing capacity of the O-RU 110 is exceeded in the one or more slots. In other words, the number of control plane sections to be processed by the O-RU 110 in the one or more slots may exceed the maximum number of control plane sections reported by the O-RU 110 related to its control plane processing capacity. As explained above, the reported control plane processing capacity may be lower than the actual control plane processing capacity of the O-RU 110 (e.g., due to the safety margin applied by the O-RU). Thus, the O-DU 120 may attempt to utilize the full control plane processing capacity of the O-RU 110 (e.g., by utilizing the capacity available in the safety margin).

At 203, the O-DU 120 transmits the one or more messages to the O-RU 110. The one or more messages may be transmitted, for example, via the eCPRI fronthaul interface between the O-RU 110 and the O-DU 120.

For example, the one or more messages may refer to fast control plane (FCP) messages. FCP messages may be divided into parts called "section descriptions", or "sections" in short. The section description defines characteristics of user plane (U-Plane) data to be transferred or received, including frequency, time and pattern identifier (e.g., beamId) information. One example of a section type is Section Type 1 (ST1) for most downlink and uplink radio channels.

The O-DU 120 may transmit one or more FCP messages for each slot. For instance, in a beamforming case, an FCP message for a certain slot may comprise multiple control plane sections, each section for one UE scheduled within this slot. Such a control plane section may describe, for example, frequency (e.g., physical resource block range), time (e.g., symbols) and pattern identifier (e.g., beamId) assigned for a given UE.

At 204, the O-RU 110 determines whether the control plane processing capacity of the O-RU 110 for the one or more slots is overloaded by the one or more messages.

At 205, based on or in response to determining that the control plane processing capacity of the O-RU 110 for the one or more slots is overloaded, the O-RU 110 applies the overload mitigation capability by discarding one or more control plane sections related to the one or more slots such that subsequent slots are unaffected by the overload in the one or more slots. In other words, the O-RU 110 may process control plane sections up to its control plane processing capacity per slot limit, and discard one or more further control plane sections that are exceeding the control plane processing capacity of the O-RU 110.

Herein the discarding may mean, for example, that the O-RU 110 completely ignores (i.e., neither reads nor processes) the discarded one or more control plane sections, in order to make sure that its control plane processing capacity for the subsequent slots is unaffected.

In other words, the overload mitigation capability of the O-RU 110 guarantees that the overload in one slot does not impact the next slots. Thus, the "damage" is contained to a single slot, i.e., the slot for which the O-DU 120 has exceeded the control plane processing capacity of the O-RU 110. However, if the O-DU 120 has a hazardous algorithm, it may attempt overloading more than one consecutive slot, and, in this case, the O-RU 110 may be allowed to discard data for the next slots as well.

Figure 3:
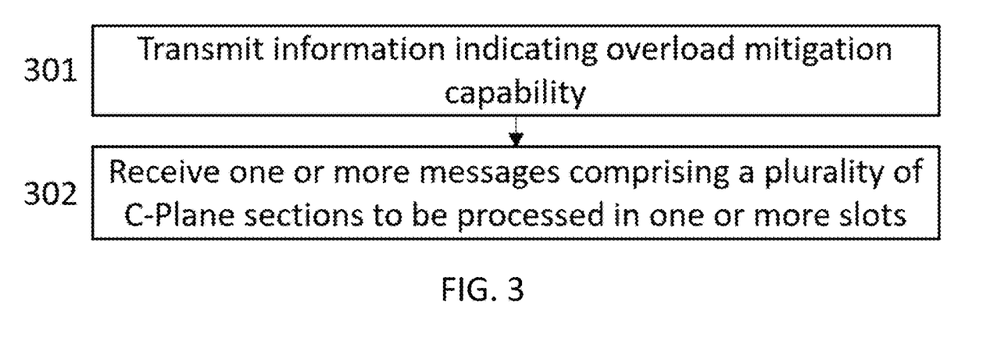
FIG. 3 illustrates a flow chart.
Figure 6:
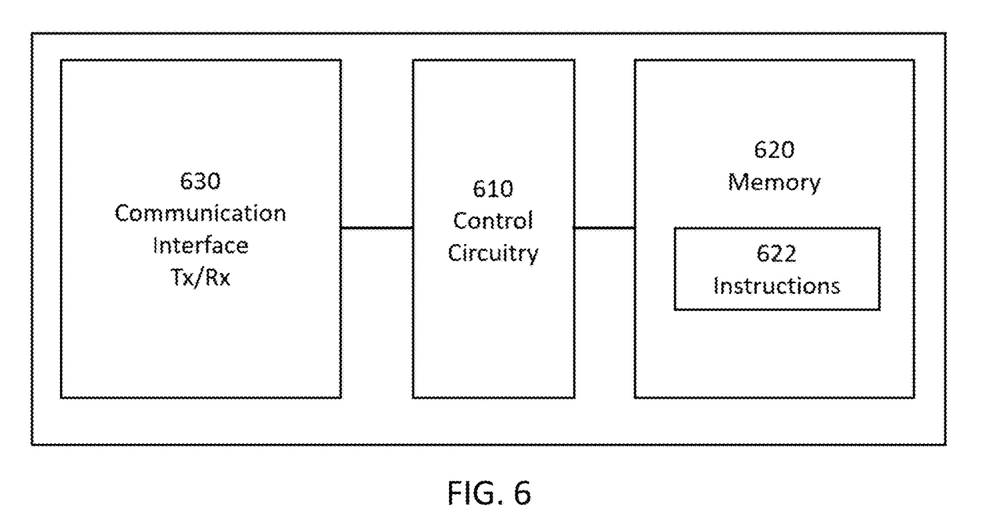
FIG. 6 illustrates an example of an apparatus.

FIG. 3 illustrates a flow chart according to an example embodiment of a method performed by an apparatus 600 depicted in FIG. 6. For example, the apparatus 600 may be, or comprise, or be comprised in, an open radio access network radio unit (O-RU) 110, or any other type of radio unit.

Referring to FIG. 3, in block 301, the apparatus 600 transmits, to a distributed unit 120, information indicating one or more capabilities of the apparatus 600, wherein the one or more capabilities comprise at least a capability for mitigating an overload of a control plane processing capacity of the apparatus in a slot.

For example, the distributed unit 120 may comprise an open radio access network distributed unit (O-DU), or any other type of RAN distributed unit. In block 302, the apparatus 600 receives, from the distributed unit 120, based on or in response to transmitting the information, one or more messages comprising a plurality of control plane sections to be processed in one or more slots.

The information may be transmitted and the one or more messages may be received via an evolved common public radio interface (eCPRI) between the apparatus 600 and the distributed unit 120.

The apparatus 600 may determine whether the control plane processing capacity for the one or more slots is overloaded by the one or more messages.

Based on or in response to determining that the control plane processing capacity for the one or more slots is overloaded, the apparatus 600 may apply the capability by discarding one or more control plane sections related to the one or more slots such that subsequent slots are unaffected by the overload in the one or more slots.

Figure 4:
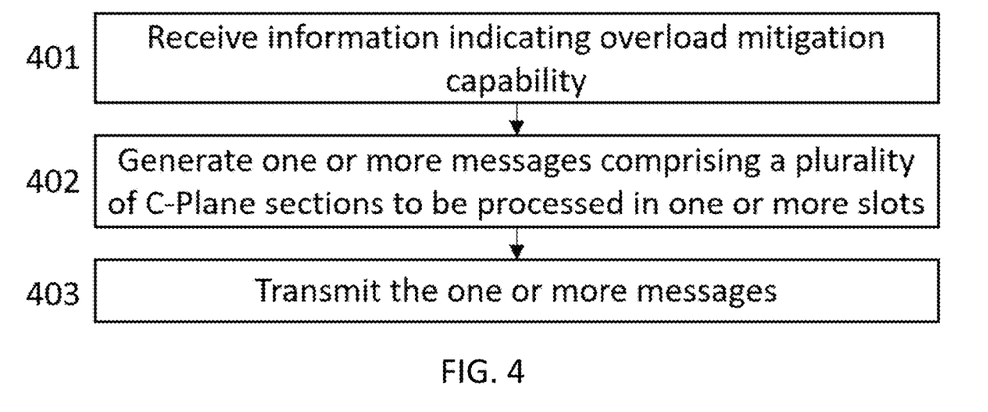
FIG. 4 illustrates a flow chart.
Figure 7:
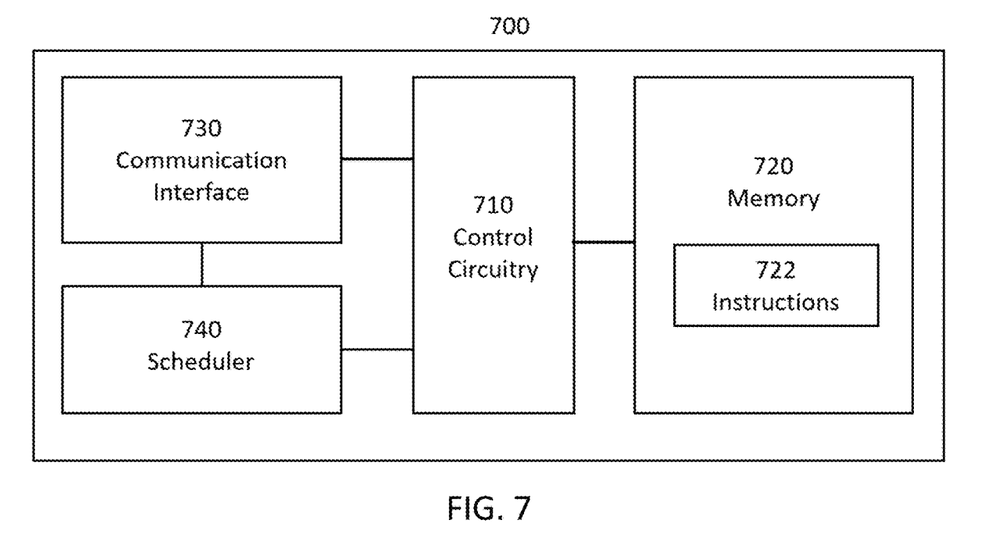
FIG. 7 illustrates an example of an apparatus.

FIG. 4 illustrates a flow chart according to an example embodiment of a method performed by an apparatus 700 depicted in FIG. 7. For example, the apparatus 700 may be, or comprise, or be comprised in, an open radio access network distributed unit (O-DU) 120, or any other type of RAN distributed unit.

Referring to FIG. 4, in block 401, the apparatus 700 receives, from a radio unit 110, information indicating one or more capabilities of the radio unit, wherein the one or more capabilities comprise at least a capability for mitigating an overload of a control plane processing capacity of the radio unit in a slot.

For example, the radio unit 110 may comprise an open radio access network radio unit (O-RU).

In block 402, the apparatus 700 generates, based at least on the information, one or more messages comprising a plurality of control plane sections to be processed in one or more slots.

The one or more messages may be generated such that a reported control plane processing capacity of the radio unit 110 is exceeded in the one or more slots.

In block 403, the apparatus 700 transmits the one or more messages to the radio unit 110.

The information may be received and the one or more messages may be transmitted via an evolved common public radio interface (eCPRI) between the apparatus 700 and the radio unit 110.

For example, the capability of the radio unit 110 may comprise a capability for discarding, in case the control plane processing capacity of the radio unit 110 for the one or more slots is overloaded by the one or more messages, one or more control plane sections related to the one or more slots such that subsequent slots are unaffected by the overload in the one or more slots.

The blocks, related functions, and information exchanges (messages) described above by means of FIGS. 2-4 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

Some example embodiments described herein may be implemented in a wireless communication network comprising a radio access network based on one or more of the following radio access technologies (RATs): Global System for Mobile Communications (GSM) or any other second generation radio access technology, Universal Mobile Telecommunication System (UMTS, 3G) based on basic wideband-code division multiple access (W-CDMA), high-speed packet access (HSPA), Long Term Evolution (LTE), LTE-Advanced, fourth generation (4G), fifth generation (5G), 5G new radio (NR), 5G-Advanced (i.e., 3GPP NR Rel-18 and beyond), or sixth generation (6G). Some examples of radio access networks include the universal mobile telecommunications system (UMTS) radio access network (UTRAN), the Evolved Universal Terrestrial Radio Access network (E-UTRA), or the next generation radio access network (NG-RAN). The wireless communication network may further comprise a core network, and some example embodiments may also be applied to network functions of the core network.

It should be noted that the embodiments are not restricted to the wireless communication network given as an example, but a person skilled in the art may also apply the solution to other wireless communication networks or systems provided with necessary properties. For example, some example embodiments may also be applied to a communication system based on Institute of Electrical and Electronics Engineers (IEEE) 802.11 specifications, or a communication system based on IEEE 802.15 specifications.

Figure 5:
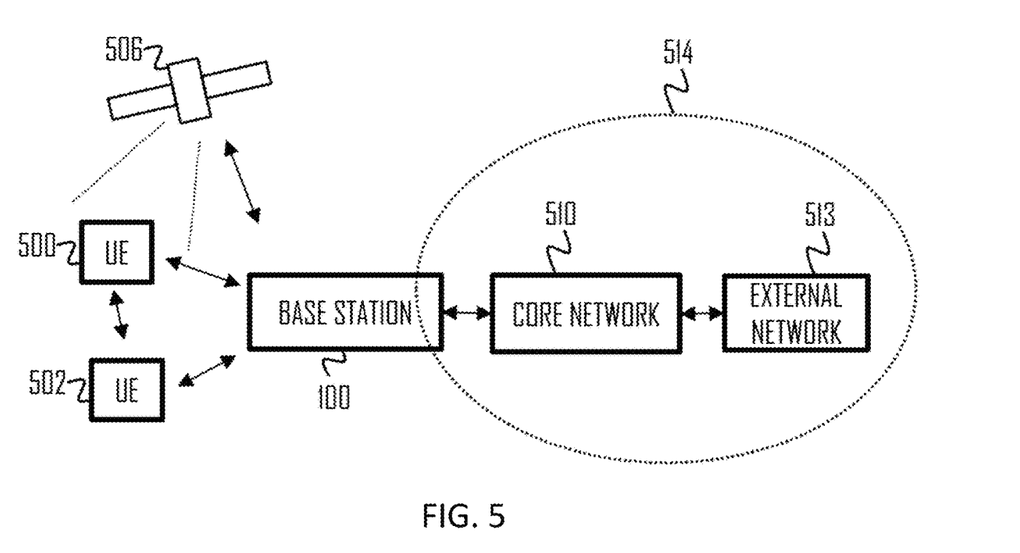
FIG. 5 illustrates an example of a wireless communication network.

FIG. 5 depicts an example of a simplified wireless communication network showing some physical and logical entities. The connections shown in FIG. 5 may be physical connections or logical connections. It is apparent to a person skilled in the art that the wireless communication network may also comprise other physical and logical entities than those shown in FIG. 5.

The example embodiments described herein are not, however, restricted to the wireless communication network given as an example but a person skilled in the art may apply the embodiments described herein to other wireless communication networks provided with necessary properties.

The example wireless communication network shown in FIG. 5 includes an access network, such as a radio access network (RAN), and a core network 510. FIG. 5 shows user equipment (UE) 500, 502 configured to be in a wireless connection on one or more communication channels in a radio cell with a base station 100 of an access network. The base station may also be referred to as a base transceiver station (BTS), an access point, a cell site, an access node, a radio access node or any other type of node capable of being in a wireless connection with a UE (e.g., UEs 500, 502).

The base station 100 may be an evolved NodeB (abbreviated as eNB or eNodeB), or a next generation evolved NodeB (abbreviated as ng-eNB), or a next generation NodeB (abbreviated as gNB or gNodeB), providing the radio cell. The wireless connection (e.g., radio link) from a UE to the base station 100 may be called uplink (UL) or reverse link, and the wireless connection (e.g., radio link) from the base station to the UE may be called downlink (DL) or forward link. UE 500 may also communicate directly with UE 502, and vice versa, via a wireless connection generally referred to as a sidelink (SL). It should be appreciated that the base station 100 or its functionalities may be implemented by using any node, host, server or access point etc. entity suitable for providing such functionalities.

The access network may comprise more than one base station, in which case the base stations may also be configured to communicate with one another over links, wired or wireless. These links between base stations may be used for sending and receiving control plane signaling and also for routing data from one base station to another base station.

The base station may include or be coupled to transceivers. From the transceivers of the base station, a connection may be provided to an antenna unit that establishes bi-directional radio links to UEs 500, 502. The antenna unit may comprise an antenna or antenna element, or a plurality of antennas or antenna elements.

The base station 100 may further be connected to a core network (CN) 510. The core network 510 may comprise an evolved packet core (EPC) network and/or a 5th generation core network (5GC). The EPC may comprise network entities, such as a serving gateway (S-GW for routing and forwarding data packets), a packet data network gateway (P-GW) for providing connectivity of UEs to external packet data networks, and a mobility management entity (MME). The 5GC may comprise one or more network functions, such as at least one of: a user plane function (UPF), an access and mobility management function (AMF), a location management function (LMF), and/or a session management function (SMF).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The core network 510 may also be able to communicate with one or more external networks 513, such as a public switched telephone network or the Internet, or utilize services provided by them. For example, in 5G wireless communication networks, the UPF of the core network 510 may be configured to communicate with an external data network via an N6 interface. In LTE wireless communication networks, the P-GW of the core network 510 may be configured to communicate with an external data network.

The illustrated UE 500, 502 is one type of an apparatus to which resources on the air interface may be allocated and assigned. The UE 500, 502 may also be called a wireless communication device, a subscriber unit, a mobile station, a remote terminal, an access terminal, a user terminal, a terminal device, or a user device just to mention but a few names. The UE may be a computing device operating with or without a subscriber identification module (SIM), including, but not limited to, the following types of computing devices: a mobile phone, a smartphone, a personal digital assistant (PDA), a handset, a computing device comprising a wireless modem (e.g., an alarm or measurement device, etc.), a laptop computer, a desktop computer, a tablet, a game console, a notebook, a multimedia device, a reduced capability (RedCap) device, a wearable device (e.g., a watch, earphones or eyeglasses) with radio parts, a sensor comprising a wireless modem, or any computing device comprising a wireless modem integrated in a vehicle.

It should be appreciated that a UE may also be a nearly exclusive uplink-only device, of which an example may be a camera or video camera loading images or video clips to a network. A UE may also be a device having capability to operate in an Internet of Things (IoT) network, which is a scenario in which objects may be provided with the ability to transfer data over a network without requiring human-to-human or human-to-computer interaction. The UE may also utilize cloud. In some applications, the computation may be carried out in the cloud or in another UE.

The wireless communication network may also be able to support the usage of cloud services, for example at least part of core network operations may be carried out as a cloud service (this is depicted in FIG. 5 by "cloud" 514). The wireless communication network may also comprise a central control entity, or the like, providing facilities for wireless communication networks of different operators to cooperate for example in spectrum sharing.

5G enables using multiple input-multiple output (MIMO) antennas in the base station 100 and/or the UE 500, 502, many more base stations than an LTE network (a so-called small cell concept), including macro sites operating in co-operation with smaller stations and employing a variety of radio technologies depending on service needs, use cases and/or spectrum available. 5G wireless communication networks may support a wide range of use cases and related applications including video streaming, augmented reality, different ways of data sharing and various forms of machine type applications, such as (massive) machine-type communications (mMTC), including vehicular safety, different sensors and real-time control.

In 5G wireless communication networks, base stations and/or UEs may have multiple radio interfaces, namely below 6 GHz, cmWave and mmWave, and also being integrable with existing legacy radio access technologies, such as LTE. Integration with LTE may be implemented, for example, as a system, where macro coverage may be provided by LTE, and 5G radio interface access may come from small cells by aggregation to the LTE. In other words, a 5G wireless communication network may support both inter-RAT operability (such as LTE-5G) and inter-RI operability (inter-radio interface operability, such as below 6 GHz-cmWave-mmWave). One of the concepts considered to be used in 5G wireless communication networks may be network slicing, in which multiple independent and dedicated virtual sub-networks (network instances) may be created within the substantially same infrastructure to run services that have different requirements on latency, reliability, throughput and mobility.

In some embodiments, a base station (e.g., base station 100) may comprise: a radio unit (RU) comprising a radio transceiver (TRX), i.e., a transmitter (Tx) and a receiver (Rx); one or more distributed units (DUs) that may be used for the so-called Layer 1 (L1) processing and real-time Layer 2 (L2) processing; and a central unit (CU) (also known as a centralized unit) that may be used for non-real-time L2 and Layer 3 (L3) processing. The CU may be connected to the one or more DUs for example via an F1 interface. Such an embodiment of the base station may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be a logical node hosting radio resource control (RRC), service data adaptation protocol (SDAP) and/or packet data convergence protocol (PDCP), of the NR protocol stack for a base station. The DU may be a logical node hosting radio link control (RLC), medium access control (MAC) and/or physical (PHY) layers of the NR protocol stack for the base station. The operations of the DU may be at least partly controlled by the CU. It should also be understood that the distribution of functions between DU and CU may vary depending on implementation. The CU may comprise a control plane (CU-CP), which may be a logical node hosting the RRC and the control plane part of the PDCP protocol of the NR protocol stack for the base station. The CU may further comprise a user plane (CU-UP), which may be a logical node hosting the user plane part of the PDCP protocol and the SDAP protocol of the CU for the base station.

Cloud computing systems may also be used to provide the CU and/or DU. A CU provided by a cloud computing system may be referred to as a virtualized CU (vCU). In addition to the vCU, there may also be a virtualized DU (vDU) provided by a cloud computing system. Furthermore, there may also be a combination, where the DU may be implemented on so-called bare metal solutions, for example application-specific integrated circuit (ASIC) or customer-specific standard product (CSSP) system-on-a-chip (SoC).

Edge cloud may be brought into the access network (e.g., RAN) by utilizing network function virtualization (NFV) and software defined networking (SDN). Using edge cloud may mean base station operations to be carried out, at least partly, in a computing system operationally coupled to a remote radio head (RRH) or a radio unit (RU) of a base station. It is also possible that base station operations may be performed on a distributed computing system or a cloud computing system located at the base station. Application of cloud RAN architecture enables RAN real-time functions being carried out at the access network (e.g., in a DU) and non-real-time functions being carried out in a centralized manner (e.g., in a CU).

It should also be understood that the distribution of functions between core network operations and base station operations may differ in future wireless communication networks compared to that of the LTE or 5G, or even be non-existent. Some other technology advancements that may be used include big data and all-IP, which may change the way wireless communication networks are being constructed and managed. 5G (or new radio, NR) wireless communication networks may support multiple hierarchies, where multi-access edge computing (MEC) servers may be placed between the core network 510 and the base station 100. It should be appreciated that MEC may be applied in LTE wireless communication networks as well.

A 5G wireless communication network ("5G network") may also comprise a non-terrestrial communication network, such as a satellite communication network, to enhance or complement the coverage of the 5G radio access network. For example, satellite communication may support the transfer of data between the 5G radio access network and the core network, enabling more extensive network coverage. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). A given satellite 506 in the mega-constellation may cover several satellite-enabled network entities that create on-ground cells. The on-ground cells may be created through an on-ground relay access node or by a base station 100 located on-ground or in a satellite.

It is obvious for a person skilled in the art that the base station 100 depicted in FIG. 5 is just an example of a part of an access network (e.g., a radio access network) and in practice, the access network may comprise a plurality of base stations, the UEs 500, 502 may have access to a plurality of radio cells, and the access network may also comprise other apparatuses, such as physical layer relay access nodes or other entities. At least one of the base stations may be a Home eNodeB or a Home gNodeB. A Home gNodeB or a Home eNodeB is a type of base station that may be used to provide indoor coverage inside a home, office, or other indoor environment.

Additionally, in a geographical area of an access network (e.g., a radio access network), a plurality of different kinds of radio cells as well as a plurality of radio cells may be provided. Radio cells may be macro cells (or umbrella cells) which may be large cells having a diameter of up to tens of kilometers, or smaller cells such as micro-, femto- or pico-cells. The base station(s) of FIG. 5 may provide any kind of these cells. A cellular radio network may be implemented as a multilayer access networks including several kinds of radio cells. In multilayer access networks, one base station may provide one kind of a radio cell or radio cells, and thus a plurality of base stations may be needed to provide such a multilayer access network.

For fulfilling the need for improving performance of access networks, the concept of "plug-and-play" base stations may be introduced. An access network which may be able to use "plug-and-play" base stations, may include, in addition to Home eNodeBs or Home gNodeBs, a Home Node B gateway, or HNB-GW (not shown in FIG. 5). An HNB-GW, which may be installed within an operator's access network, may aggregate traffic from a large number of Home eNodeBs or Home gNodeBs back to a core network of the operator.

FIG. 6 illustrates an example of an apparatus 600 comprising means for performing one or more of the example embodiments described above. For example, the apparatus 600 may be, or comprise, or be comprised in, an open radio access network radio unit (O-RU) 110, or any other type of radio unit.

The apparatus 600 may comprise, for example, a circuitry or a chipset applicable for realizing one or more of the example embodiments described above. The apparatus 600 may be an electronic device or computing system comprising one or more electronic circuitries. The apparatus 600 may comprise a control circuitry 610 such as at least one processor, and at least one memory 620 storing instructions 622 which, when executed by the at least one processor, cause the apparatus 600 to carry out one or more of the example embodiments described above. Such instructions 622 may, for example, include computer program code (software). The at least one processor and the at least one memory storing the instructions may provide the means for providing or causing the performance of any of the methods and/or blocks described above.

The processor is coupled to the memory 620. The processor is configured to read and write data to and from the memory 620. The memory 620 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 620 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 620 or, alternatively or additionally, they may be received, by the apparatus, via an electromagnetic carrier signal and/or may be copied from a physical entity such as a computer program product. Execution of the computer readable instructions causes the apparatus 600 to perform one or more of the functionalities described above.

The memory 620 may be implemented using any suitable data storage technology, such as semiconductor-based memory devices, flash memory, magnetic memory devices and systems, optical memory devices and systems, fixed memory and/or removable memory.

The apparatus 600 may further comprise or be connected to a communication interface 630 comprising hardware and/or software for realizing communication connectivity according to one or more communication protocols. For example, the communication interface 630 may comprise a fronthaul interface, such as an eCPRI interface, for communicating with a distributed unit 120. The communication interface 630 may provide means for performing some of the blocks for one or more example embodiments described above.

The communication interface 630 may also provide the apparatus with radio communication capabilities to communicate in the wireless communication network. The communication interface 630 may, for example, provide a radio interface to one or more UEs 500, 502. The communication interface 630 may comprise at least one transmitter (Tx) and at least one receiver (Rx) that may be integrated to the apparatus 600 or that the apparatus 600 may be connected to.

It is to be noted that the apparatus 600 may further comprise various components not illustrated in FIG. 6. The various components may be hardware components and/or software components.

FIG. 7 illustrates an example of an apparatus 700 comprising means for performing one or more of the example embodiments described above. For example, the apparatus 700 may be, or comprise, or be comprised in, an open radio access network distributed unit (O-DU) 120, or any other type of RAN distributed unit.

The apparatus 700 may comprise, for example, a circuitry or a chipset applicable for realizing one or more of the example embodiments described above. The apparatus 700 may be an electronic device comprising one or more electronic circuitries. The apparatus 700 may comprise a communication control circuitry 710 such as at least one processor, and at least one memory 720 storing instructions 722 which, when executed by the at least one processor, cause the apparatus 700 to carry out one or more of the example embodiments described above. Such instructions 722 may, for example, include computer program code (software). The at least one processor and the at least one memory storing the instructions may provide the means for providing or causing the performance of any of the methods and/or blocks described above.

The processor is coupled to the memory 720. The processor is configured to read and write data to and from the memory 720. The memory 720 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 720 stores computer readable instructions that are executed by the processor. For example, non-volatile memory stores the computer readable instructions, and the processor executes the instructions using volatile memory for temporary storage of data and/or instructions.

The computer readable instructions may have been pre-stored to the memory 720 or, alternatively or additionally, they may be received, by the apparatus, via an electromagnetic carrier signal and/or may be copied from a physical entity such as a computer program product. Execution of the computer readable instructions causes the apparatus 700 to perform one or more of the functionalities described above.

The memory 720 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data, such as a current neighbour cell list, and, in some example embodiments, structures of frames used in the detected neighbour cells.

The apparatus 700 may further comprise a communication interface 730 comprising hardware and/or software for realizing communication connectivity with one or more wireless communication devices according to one or more communication protocols. For example, the communication interface 730 may comprise a fronthaul interface, such as an eCPRI interface, for communicating with a radio unit 110. The communication interface 730 may provide means for performing some of the blocks for one or more example embodiments described above.

The apparatus 700 may further comprise a scheduler 740 that is configured to allocate radio resources. The scheduler 740 may be configured along with the communication control circuitry 710 or it may be separately configured.

It is to be noted that the apparatus 700 may further comprise various components not illustrated in FIG. 7. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory (ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways within the scope of the claims. The embodiments are not limited to the example embodiments described above, but may vary within the scope of the claims. Therefore, all words and expressions should be interpreted broadly, and they are intended to illustrate, not to restrict, the embodiments.

The invention claimed is:

1. An apparatus comprising at least one processor, and at least one memory storing instructions that, when executed by the at least one processor, cause the apparatus at least to:
    transmit, to a distributed unit, information indicating one or more capabilities of the apparatus, wherein the one or more capabilities comprise at least a capability for mitigating an overload of a control plane processing capacity of the apparatus in a slot;

receive, from the distributed unit, based on transmitting the information, one or more messages comprising a plurality of control plane sections to be processed in one or more slots;

determine whether the control plane processing capacity for the one or more slots is overloaded by the one or more messages; and based on determining that the control plane processing capacity for the one or more slots is overloaded, apply the capability by discarding one or more control plane sections related to the one or more slots such that subsequent slots are unaffected by the overload in the one or more slots.

2. The apparatus of claim 1, wherein the information is transmitted and the one or more messages are received via an evolved common public radio interface, eCPRI, between the apparatus and the distributed unit.

3. The apparatus of claim 1, wherein the apparatus comprises an open radio access network radio unit, O-RU, and wherein the distributed unit comprises an open radio access network distributed unit, O-DU.

4. An apparatus comprising at least one processor, and at least one memory storing instructions that, when executed by the at least one processor, cause the apparatus at least to:

receive, from a radio unit, information indicating one or more capabilities of the radio unit, wherein the one or more capabilities comprise at least a capability for mitigating an overload of a control plane processing capacity of the radio unit in a slot;

generate, based at least on the information, one or more messages comprising a plurality of control plane sections to be processed in one or more slots; and transmit the one or more messages to the radio unit, wherein the radio unit is configured to:

determine, based on the transmitted one or more messages, whether the control plane processing capacity for the one or more slots is overloaded by the one or more messages; and based on determining that the control plane processing capacity for the one or more slots is overloaded, apply the capability by discarding one or more control plane sections related to the one or more slots such that subsequent slots are unaffected by the overload in the one or more slots.

5. The apparatus of claim 4, wherein the one or more messages are generated such that a reported control plane processing capacity of the radio unit is exceeded in the one or more slots.

6. The apparatus of claim 4, wherein the capability of the radio unit comprises a capability for discarding, in case the control plane processing capacity of the radio unit for the one or more slots is overloaded by the one or more messages, one or more control plane sections related to the one or more slots such that subsequent slots are unaffected by the overload in the one or more slots.

7. The apparatus of claim 4, wherein the information is received and the one or more messages are transmitted via an evolved common public radio interface, eCPRI, between the apparatus and the radio unit.

8. The apparatus of claim 4, wherein the apparatus comprises an open radio access network distributed unit, O-DU, and wherein the radio unit comprises an open radio access network radio unit, O-RU.

9. A method comprising:

transmitting, by an apparatus, to a distributed unit, information indicating one or more capabilities of the apparatus, wherein the one or more capabilities comprise at least a capability for mitigating an overload of a control plane processing capacity of the apparatus in a slot;

receiving, by the apparatus, from the distributed unit, based on transmitting the information, one or more messages comprising a plurality of control plane sections to be processed in one or more slots;

determining whether the control plane processing capacity for the one or more slots is overloaded by the one or more messages; and based on determining that the control plane processing capacity for the one or more slots is overloaded, applying the capability by discarding one or more control plane sections related to the one or more slots such that subsequent slots are unaffected by the overload in the one or more slots.

* * * * *